United States Patent [19]

Yoshimura

[11] Patent Number: 5,933,854
[45] Date of Patent: Aug. 3, 1999

[54] DATA SECURITY SYSTEM FOR TRANSMITTING AND RECEIVING DATA BETWEEN A MEMORY CARD AND A COMPUTER USING A PUBLIC KEY CRYPTOSYSTEM

[75] Inventor: Yoshimasa Yoshimura, Itami, Japan

[73] Assignee: Mitsubishi Denki Kabushiki Kaisha, Tokyo, Japan

[21] Appl. No.: 08/541,300

[22] Filed: Oct. 10, 1995

[30] Foreign Application Priority Data

May 31, 1995 [JP] Japan ................................. 7-133286

[51] Int. Cl.⁶ .............................. G06F 12/14; H04L 9/30
[52] U.S. Cl. ............................... 711/164; 380/30; 380/4; 711/115
[58] Field of Search ................ 380/25, 3, 4, 23, 380/50, 29, 212.2, 144.45, 30; 395/475; 711/164, 147, 115; 705/41; 235/380

[56] References Cited

U.S. PATENT DOCUMENTS

| 4,910,774 | 3/1990 | Barakat | 380/23 |
| 5,202,922 | 4/1993 | Iijima | 380/45 |
| 5,311,595 | 5/1994 | Bjerrum et al. | 380/25 |
| 5,381,478 | 1/1995 | Iijima | 380/44 |
| 5,428,685 | 6/1995 | Kadooka et al. | 380/25 |
| 5,623,637 | 4/1997 | Jones et al. | 711/164 |

OTHER PUBLICATIONS

Philip Zimmermann, "Pretty Good Privacy Public Key Encryption for the Masses", Oct. 11, 1994, Ver 2.6.2, Phil's Pretty Good Software, pgpdocLand pgdoc2.

*Primary Examiner*—Eddie P. Chan
*Assistant Examiner*—Hong Kim
*Attorney, Agent, or Firm*—Leydig, Voit & Mayer, Ltd.

[57] ABSTRACT

In a system wherein a memory card is connected to a computer, data stored in a memory device in the memory card is read by a processor provided in the computer. An address signal and a data signal from the computer to the memory card, and/or a data signal from the memory card to the computer are coded with coding keys by a coder, while the coded signal is decoded by a decoder with a decoding key corresponding to the coding keys. The coder and the decoder adopts a public key system, and it is difficult to determine the decoding key even if the coding keys are known. In modified examples, coding keys are not provided beforehand in the computer or memory card, and they are latched in a latch device when the memory card is connected to the computer. When the coding keys and decoding keys are stored in the memory card, they are changed for each memory card.

4 Claims, 9 Drawing Sheets

DATA SECURITY SYSTEM FOR TRANSMITTING AND RECEIVING DATA BETWEEN A MEMORY CARD AND A COMPUTER USING A PUBLIC KEY CRYPTOSYSTEM

BACKGROUND OF THE INVENTION

1. Field of the Invention

The present invention relates to a system comprising a computer or terminal and a memory card connected to the computer.

2. Description of the Prior Art

A memory card is used as an external storage medium for a computer or terminal. When a memory card is connected to a computer, it is easy to access the memory card, and data can be read from and written to the memory card. Then, a third party can copy the data in the memory card or even reproduce the memory card itself. Therefore, in order for memory cards to be used in various areas, it is desired to protect secret data in the memory cards.

SUMMARY OF THE INVENTION

An object of the present invention is to provide a system comprising a computer or terminal and a memory card connected to the computer wherein secret data in the memory card can be protected.

In accordance with one aspect, the present invention is directed to a system wherein a memory card is connected to the computer, and the data stored in a memory device in a memory card is read by a processor provided in the computer. A data coder in the memory card codes a data signal to be output to the computer by using cipher keys stored in a memory device. On the other hand, a data decoder in the computer decodes the coded data received from the data coder by using a decoding key stored in a different memory device. The decoding key corresponds to the cipher keys, and the coder and the decoder use the public keys of the cipher keys and decoding key. In a modified example, cipher keys are stored in the memory card and they are sent to a latch device in the computer when the memory card is connected to the computer.

An advantage of the present invention is that a memory card can be accessed only by a computer having specified cipher keys or the like.

Another advantage of the present invention is that even if a third party has a memory card illegitimately, it is difficult to identify the decoding key in correspondence to cipher keys.

A further advantage of the present invention is that accessing a memory card by changing cipher keys or decoding key is presented.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Referring now to the drawings, wherein like reference characters designate like or corresponding parts throughout the several views, embodiments of the invention are explained below. In the embodiments explained below, RSA (Rivest, Shamir and Aldeman) codes are used as a public key cryptosystem where the decoding key is different from the coding key. Coding and decoding of data with RAS codes is explained first.

Step 1: Two different prime numbers p and q are selected, and a product n thereof is calculated.

Step 2: A minimum common multiplier $L=lcm(p-1, q-1)$ is calculated.

Step 3: An arbitrary number e ($1<e<L$) is selected which satisfies a maximum common multiplier gcm (e, L)=1, and an integral number d satisfying $$e \cdot d \bmod L = 1$$

is calculated, wherein e and n are cipher keys (or coding keys) while d is a decoding key.

Step 4: IF M and C denote data and coded data thereof, coding is performed as follows:

$$C = M^e \bmod n. \quad (1)$$

On the other hand, decoding is performed as follows:

$$M = C^d \bmod n. \quad (2)$$

Usually, the prime numbers p and q are large numbers having 100 digits in a decimal system.

A characteristic of the RSA algorithm is that when large prime numbers p and q are used, it is very difficult to identify the decoding key d, and it is impossible to identify it in a reasonable time due to the difficulty involved factorization.

A simple example of the coding and decoding in the public key cryptosystem is explained. if p=5 and q=11, n=55, and L=20. If e satisfying gcm (e, 20)=1 is taken as, for example, 7, d satisfying 7·d mod 20=1 is 3. If a normal data M=9 is coded, a coded data $C=9^7 \bmod 55=4$ is obtained according to Eq. (1). On the other hand, when the coded data C=4 is decoded, $4^3 \bmod 55=9$ is obtained as the normal data M according to Eq. (2). In this example, if a third party detects the coding keys e=7 and n=55, n is guessed to be a product of two primary numbers of p=5 and q=11 and L=lcm(4, 10)=20. Then, d satisfying 7·d mod 20=1 is guessed to be 3. However, the prime numbers p and q are actually large numbers having about 100 digits in a decimal based system. Therefore, even if coding keys e and d are known, it is impossible to identify the decoding key d because it is difficult to determine primary numbers p and q from a synthesized number n. Thus, by adopting a public key cryptosystem, data can be kept in secrecy even if the coding keys e and n are known to a third party.

Figure 1:
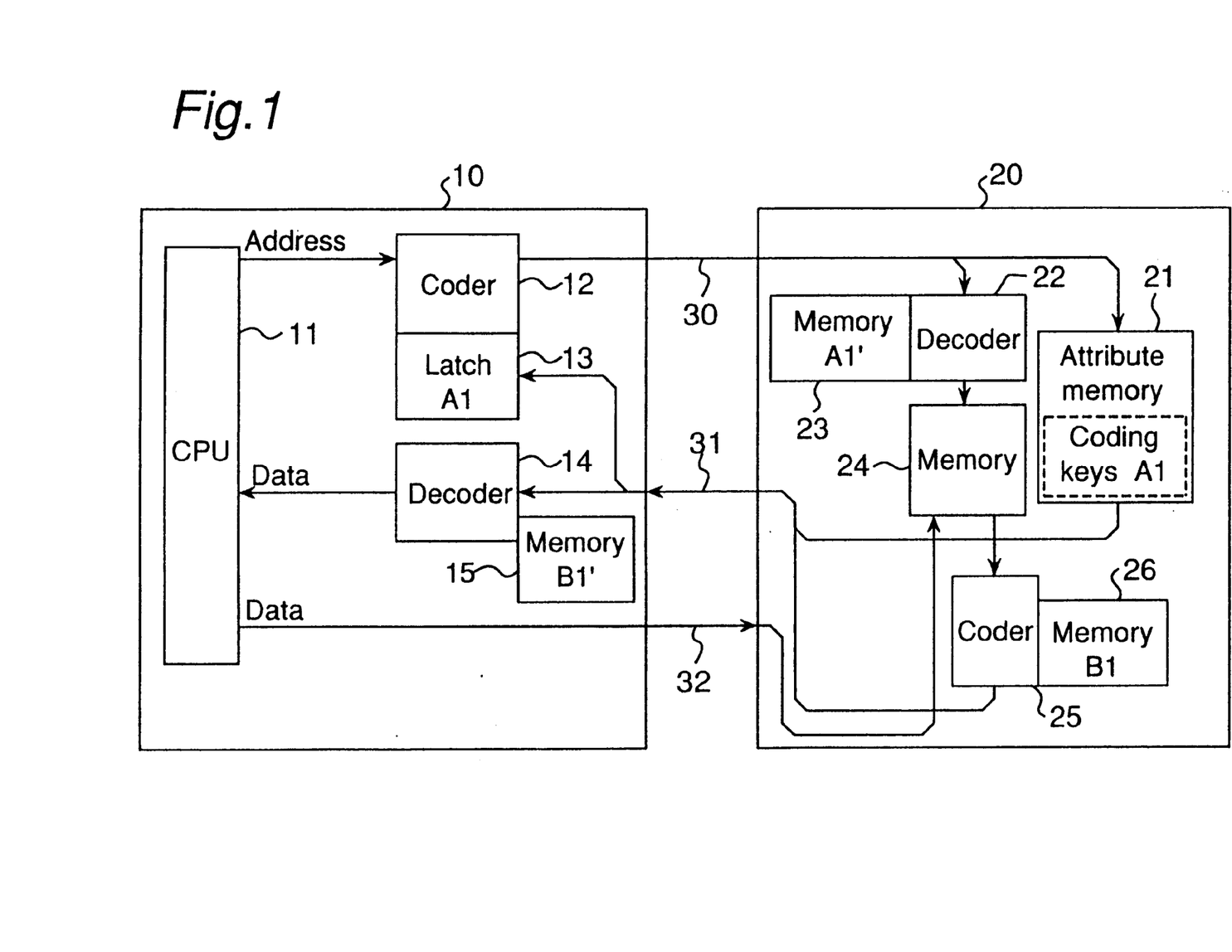
FIG. 1 is a block diagram of a system in accordance with a first embodiment comprising a computer or terminal and a memory card connected to the terminal.

FIG. 1 shows a block diagram of a system in accordance with a first embodiment comprising a terminal or computer 10 and a memory card 20 connected thereto. The terminal 10 and the memory card 20 are connected via an address bus 30, a first data bus 31 for transmitting data from the memory card 20 to the terminal 10, and a second data bus 32 for transmitting data from the terminal 10 to the memory card 20. In this system, an address signal and a data signal to be transmitted by the terminal 10 to the memory card 20 are coded with public keys A1 and B1 by a coder 12 in the terminal 10 and by a coder 25 in the memory card 20, respectively. It is a feature that the coding key A1 used by the terminal 10 for coding an address signal is not provided at first in the terminal 10. The coding key A1 is stored in an attribute memory 21 in the memory card 20, and it is sent to the terminal 10 when the memory card 20 is connected to the terminal 10. Therefore, the coding keys A1 and B1 can be different for each memory card 20.

The system of this embodiment is explained further. When the memory card 20 is connected to the terminal 10, a central processing unit (CPU) 11 in the terminal 10 first sends a prescribed address signal according to specifications of JAIDA (Japan Electronic Industry Development Association) through a coder 12 and the address bus 30 to the memory card 20. When the memory card 20 is connected, the latch 13 has no data, and the coder 12 outputs the as-received address signal. Then, the terminal 10 receives attribute data including a coding key A1 read from the attribute memory 21 through the first data bus 31 and latches the coding key A1 in the latch 13.

When data is read from the memory card 20, the CPU 11 in the terminal 10 outputs an address signal for designating a read address to the memory card 20. The coder 12 codes the read address with the coding key A1 stored in the latch 13, and the coded address signal is transmitted through the address bus 30 to a decoder 22 in the memory card 20. The decoder 22 decodes the coded address signal with a decoding key A1' stored in a memory 23, where the decoding key A1' corresponds to the coding key A1, and it sends the decoded address signal to the memory 24. A coder 25 receives a data read from the memory 24 according to the address signal, and it codes the data with coding key B1 stored in a memory 26. The coded data is sent through the first data bus 31 to a decoder 14 in the terminal 10. The decoder 14 decodes the coded data with a decoding key B1' stored in a memory 15, where the decoding key B1' corresponds to the coding key B1. The decoder 14 sends the decoded data to CPU 11.

When data is written to the memory card 20, the CPU 11 in the terminal 10 outputs an address signal for designating a write address to the coder 12 and a data signal to be written to the memory 24 to the data bus 32. The coder 12 codes the read address with the coding key A1 stored in the latch 13, and the coded address signal is transmitted through the address bus 30 to the decoder 22 in the memory card 20. The decoder 22 decodes the coded address signal with the decoding key A1' stored in the memory 23, and it sends the decoded address signal to the memory 24. The memory 24 writes the data received through the data bus 32 at an address designated by the address signal.

In the above-mentioned system, the coding key A1 and the decoding key A1' are stored in the memory card 20, and they may be any numbers. Data reading and writing for the memory card 20 are only possible when a coding key stored in the memory card 20 corresponds to a decoding key stored in the terminal 10. In the system, the coding key A1 is not stored in the terminal 10 at first, and it is sent from the memory card 20. Therefore, if the coding key A1 is not read from the memory card 20 to a terminal connecting the memory card 20, the terminal cannot read the data in the memory card. In other words, the memory card 20 can only be used with the terminal having a corresponding decoding key.

On the other hand, the coding key B1 and the decoding key B1' are stored in the memory card 20 and in the terminal 10, respectively. Therefore, the memory card 20 can only be used with the terminal 10 having the decoding key B1'. Then, even if a third party can detect the decoding key A1' from the memory card 20, it is practically impossible to identify the coding key B1 used by the coder 25 in the memory card 20. Therefore, if a third party cannot use the terminal 10 with the decoding key B1', it cannot use the data stored in the memory card 20.

Figure 2:
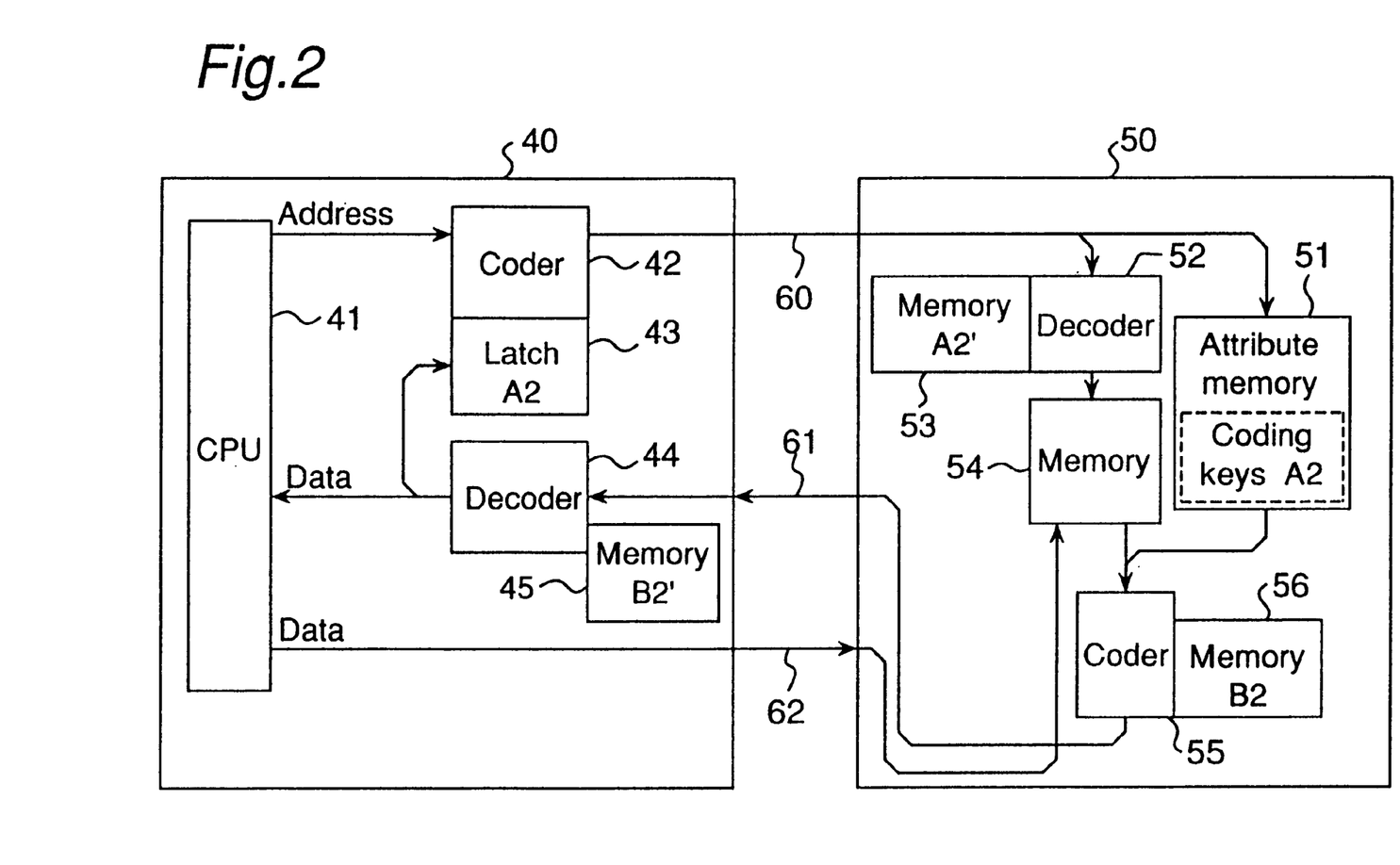
FIG. 2 is a block diagram of a system in accordance with a second embodiment comprising a computer or terminal and a memory card connected to the terminal.

FIG. 2 shows a block diagram of a system of a second embodiment comprising a terminal or computer 40 and a memory card 50 connected thereto. The terminal 40 and the memory card 50 are connected via an address bus 60, a first data bus 61 for transmitting data from the memory card 50 to the terminal 40, and a second data bus 62 for transmitting data from the terminal 40 to the memory card 50. In this system, an address signal to be transmitted from the terminal 40 to the memory card 50 is coded with a public key, while a data signal to be transmitted from the memory card 50 to the terminal 40 is also coded with another public key. Similarly to the first embodiment shown in FIG. 1, a coding key A2 used by the terminal 40 for coding an address signal is stored in an attribute memory 51 in the memory card 50. The coding key A2 stored in the attribute memory 51 is sent to the terminal 40 when the memory card 50 is connected to the terminal 40, but it is a feature of this embodiment that the coding key A2 is sent to the terminal 40 after being coded by a coder 55 in the memory card 50. The coded coding key is decoded by a decoder 44 in the terminal 40 and latched in a latch 43. It is to be noted here that the memory card 50 does not satisfy the interface specification of the JAIDA standard because the coding key A2 is output to the terminal 40 after coded.

The system of this embodiment is explained further. When the memory card 50 is connected to the terminal 40, a central processing unit (CPU) 41 in the terminal 40 first sends a prescribed address signal through a coder 42 and the address bus 60 to the memory card 50. When the memory card 50 is connected, the latch 43 connected to the coder 42 latches no data, and the coder 42 outputs the as-received address signal to an attribute memory 51 in the memory card 50. The attribute memory 51 outputs attribute data including a coding key A2 to a coder 55, and the coder 55 codes the coding key A2 with a coding key B2 stored in a memory 56, and sends the coded coding key A2 through the first data bus 61 to a decoder 44 in the terminal 40. The decoder 44 decodes the coded coding key A2 with a decoding key B2', and the decoded coding key A2 is latched in a latch 43. The decoding key B2' corresponds to the coding key B2. The terminal 40 receives attribute data including a coding key A2 read from the attribute memory 51 through the first data bus 61.

When data is read from the memory card 50, the CPU 41 in the terminal 40 outputs an address signal for designating a read address to the memory card 50. The coder 42 codes the read address with the coding key A1 stored in the latch 43, and the coded address signal is transmitted through the address bus 60 to a decoder 52 in the memory card 20. The decoder 52 decodes the coded address signal with a decoding key A2' stored in a memory 53, where the decoding key A2' corresponds to the coding key A2, and it sends the decoded address signal to the memory 54. A coder 55 receives data read from the memory 54 according to the address signal, and it codes the data with coding key B2 stored in a memory 56. The coded data is sent through the first data bus 61 to the decoder 44 in the terminal 40. The decoder 44 decodes the coded data with a decoding key B2' stored in a memory 45, where the decoding key B2' corresponds to the coding key B2. The decoder 44 sends the decoded data to the CPU 41.

When data is written to the memory card 50, the CPU 41 in the terminal 40 outputs an address signal for designating a write address to the coder 42 and a data signal to be written to the memory 54 to the second data bus 62. The coder 42 codes the read address with the coding key A2 stored in the latch 43, and the coded address signal is transmitted through the address bus 60 to a decoder 52 in the memory card 50. The decoder 52 decodes the coded address signal with the decoding key A2' stored in a memory 53, and it sends the decoded address signal to the memory 54. The memory 54 writes the data received through the data bus 62 at an address designated by the address signal.

In the above-described system, the coding key A2 is coded in the memory card 50 before it is sent to the terminal 40. Therefore, it becomes more difficult to determine the coding key A2 by a third party than in the system of the first embodiment.

Figure 3:
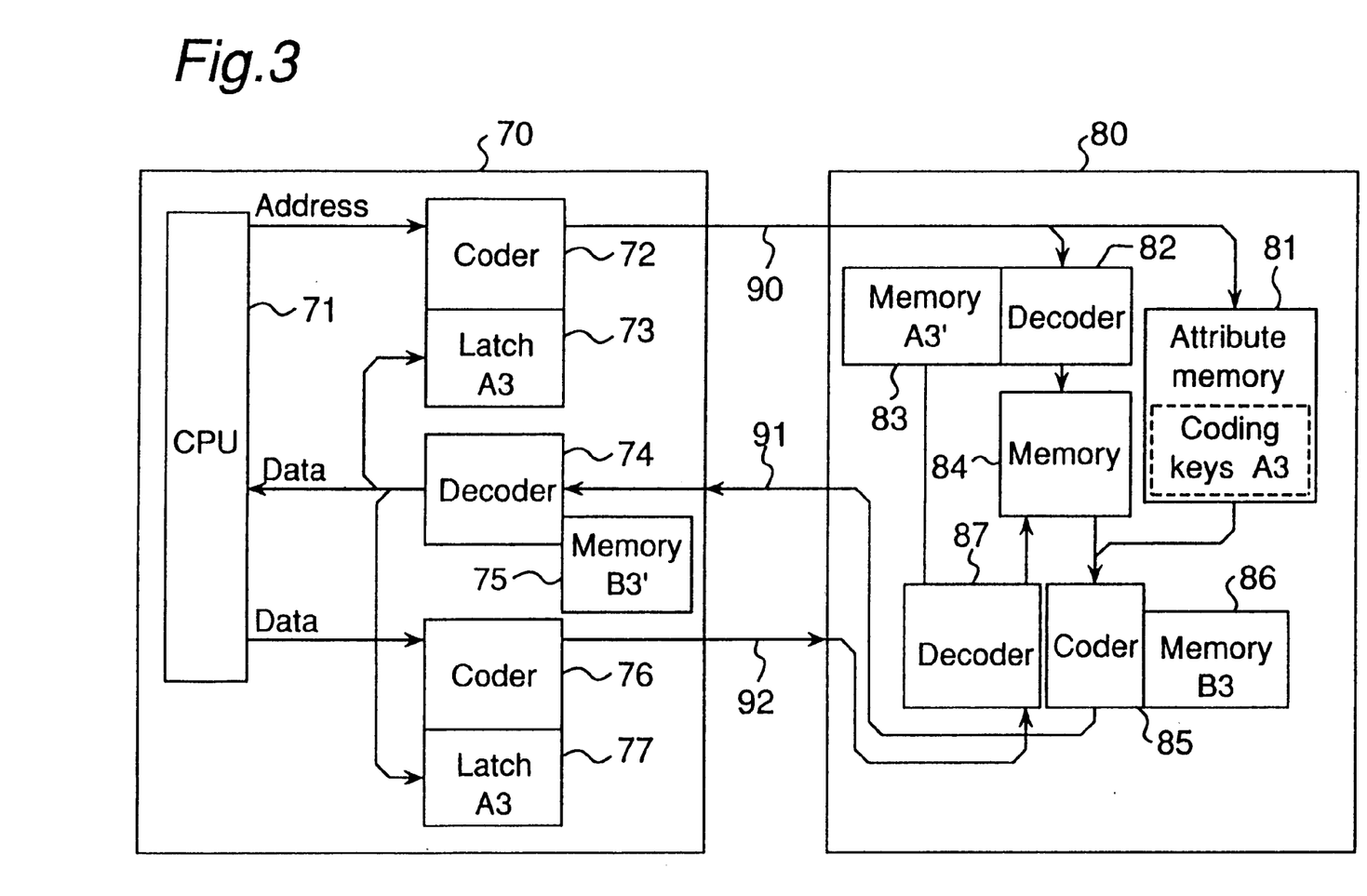
FIG. 3 is a block diagram of a system in accordance with a third embodiment comprising a computer or terminal and a memory card connected to the terminal.

FIG. 3 shows a block diagram of a system of a third embodiment comprising a terminal or computer 70 and a memory card 80 connected thereto. The terminal 70 and the memory card 80 are connected via an address bus 90, a first data bus 91 for transmitting data from the memory card 80 to the terminal 90, and a second data bus 82 for transmitting data from the terminal 70 to the memory card 80. In this system, an address signal and a write data signal to be transmitted from the terminal 70 to the memory card 80 are coded with a public key A3, while a data signal to be transmitted from the memory card 80 to the terminal 70 is also coded with another public key B3. Similarly to the second embodiment shown in FIG. 2, the coding key A3 used by the terminal 70 is stored in an attribute memory 81 in the memory card 80, and the coding key A3 stored in the attribute memory 81 is sent after coded to the terminal 70 when the memory card 80 is connected to the terminal 70. It is a feature of the embodiment that data to be written to the memory card 80 is also coded. Thus, data from being written can be prevented to be copied when transmitted to the memory card 80.

The system of this embodiment is explained further. When the memory card 80 is connected to the terminal 70, a central processing unit (CPU) 71 in the terminal 70 first sends a prescribed address signal through a coder 72 and the address bus 90 to the memory card 80. When the memory card 80 is connected, a latch 73 connected to the coder 72 latches no data, and the coder 72 outputs the as-received address signal to an attribute memory 81 in the memory card 80. The attribute memory 81 outputs attribute data including a coding key A3 to a coder 85, and the coder 85 codes the coding key A3 with a coding key B3 stored in a memory 86, and sends the coded coding key through the first data bus 91 to a decoder 74 in the terminal 70. The decoder 74 decodes the coded coding key A3 with a decoding key B3', and the decoded coding key A3 is latched in latches 73 and 77. The decoding key B3' corresponds to the coding key B3. The terminal 70 receives attribute data including a coding key A3 read from the attribute memory 81 through the first data bus 91.

When data is read from the memory card 80, the CPU 71 in the terminal 70 outputs an address signal for designating a read address to the memory card 80. The coder 72 codes the read address with the coding key A3 stored in the latch 73, and the coded address signal is transmitted through the address bus 90 to a decoder 82 in the memory card 80. The decoder 82 decodes the coded address signal with a decoding key A3' stored in a memory 83, where the decoding key A3' corresponds to the coding key A3, and it sends the decoded address signal to the memory 84. A coder 85 receives data read from the memory 84 according to the address signal, and it codes the data with coding key B3 stored in a memory 86. The coded data is sent through the first data bus 91 to the decoder 74 in the terminal 70. The decoder 74 decodes the coded data with a decoding key B3' stored in a memory 75, where the decoding key B3' corresponds to the coding key B3. The decoder 74 sends the decoded data to the CPU 71.

When data is written to the memory card 80, the CPU 71 in the terminal 70 outputs an address signal for designating a write address to the coder 72 and a data signal to be written to the memory 84 to a coder 76. The coder 72 codes the read address with the coding key A3 stored in the latch 73, and the coded address signal is transmitted through the address bus 90 to a decoder 82 in the memory card 80. The decoder 82 decodes the coded address signal with the decoding key A3' stored in a memory 83, and it sends the decoded address signal to the memory 84. On the other hand, the coder 76 codes the write data with the coding key A3 also latched in a latch 77 and sends the coded data through the second data bus 92 to a decoder 87 in the memory card 80. The decoder 87 decodes the coded data with a decoding key A3' stored in the memory 83 and sends the decoded data to the memory 84. Then, the memory 84 writes the data received through the data bus 92 at the address designated by the address signal.

In the above-mentioned system, the address signal, the read data signal and the write data signal transmitted between the terminal 70 and the memory card 80 are all coded. Therefore, the secrecy of data is improved further than in the systems of the first and second embodiments.

Figure 4:
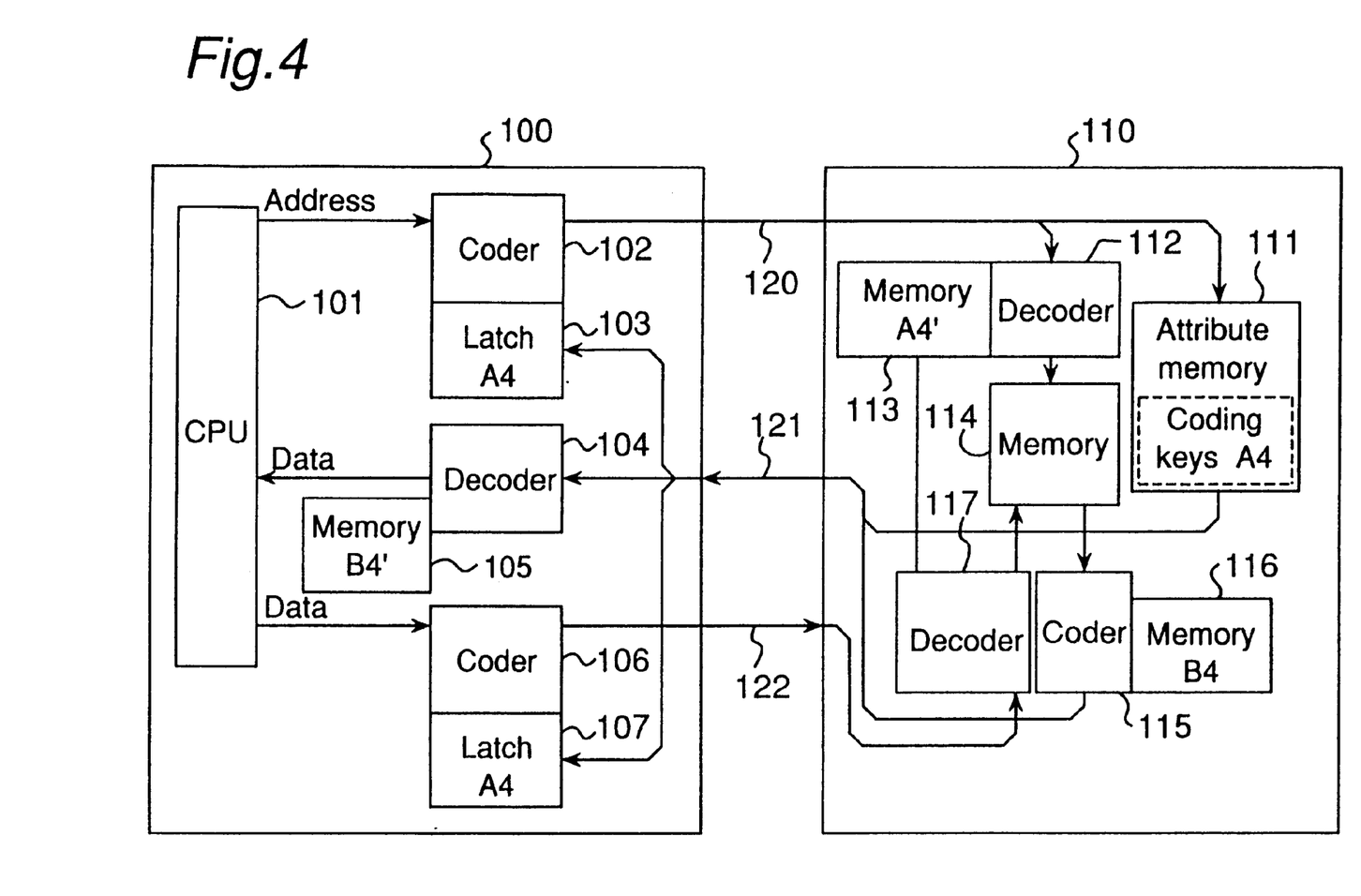
FIG. 4 is a block diagram of a system in accordance with a fourth embodiment comprising a computer or terminal and a memory card connected to the terminal.

FIG. 4 shows a block diagram of a system of a fourth embodiment comprising a terminal or computer 100 and a memory card 110 connected thereto. The terminal 100 and the memory card 110 are connected via an address bus 120, a first data bus 121 for transmitting data from the memory card 110 to the terminal 120, and a second data bus 122 for transmitting data from the terminal 100 to the memory card 110. In this system, an address signal and a data signal to be transmitted from the terminal 70 to the memory card 80 are coded with a public key A4, while a data signal to be transmitted from the memory card 80 to the terminal 70 is also coded with another public key B4. The coding key A4 used by the terminal 100 for coding an address signal and a data signal is stored in an attribute memory 111 in the memory card 110, and the coding key A4 stored in the attribute memory 111 is sent after coding to the terminal 100 when the memory card 110 is connected to the terminal 100. It is a feature of the embodiment that the coding key A4 is directly output to the terminal 100. Therefore, data including the coding key A4 stored in the attribute memory 111 can be read by any terminal using JAIDA specifications. Therefore, the memory card can be used widely.

The system of this embodiment is explained further. When the memory card 110 is connected to the terminal 100, a central processing unit (CPU) 101 in the terminal 100 first sends a prescribed address signal according to JAIDA specifications through a coder 102 and the address bus 120 to the memory card 110. When the memory card 110 is connected, a latch 103 connected to the coder 102 latches no data, and the coder 102 outputs the as-received address signal to an attribute memory 111 in the memory card 110. The attribute memory 111 outputs attribute data including a coding key A4 directly through the data bus 121 to the terminal 100, and the coding key A4 is latched in latches 103 and 107 in the terminal 100.

When data is read from the memory card 110, the CPU 101 in the terminal 100 outputs an address signal for designating a read address to the memory card 110. The coder 102 codes the read address with the coding key A4 stored in the latch 103, and the coded address signal is transmitted through the address bus 120 to a decoder 112 in the memory card 110. The decoder 112 decodes the coded address signal with a decoding key A4' stored in a latch 113, where the decoding key A4' corresponds to the coding key A4, and it sends the decoded address signal to the memory 114. A coder 115 receives data read from the memory 114 according to the address signal, and it codes the data with coding key B4 stored in a memory 116. The coded data is sent through the first data bus 121 to the decoder 104 in the terminal 100. The decoder 104 decodes the coded data with a decoding key B4' stored in a memory 105, where the decoding key B4' corresponds to the coding key B4. The decoder 104 sends the decoded data to CPU 101.

When data is written to the memory card 110, the CPU 101 in the terminal 100 outputs an address signal for designating a write address to the coder 102 and a data signal to be written to the memory 114 to a coder 106. The coder 102 codes the read address with the coding key A4 stored in the latch 103, and the coded address signal is transmitted through the address bus 120 to a decoder 112 in the memory card 110. The decoder 112 decodes the coded address signal with the decoding key A4' stored in a memory 113, and it sends the decoded address signal to the memory 114. On the other hand, the coder 106 codes the data with the coding key A4 also latched in a latch 107 and sends the coded data through the second data bus 122 to a decoder 117 in the memory card 110. The decoder 117 decodes the coded data with a decoding key A4' stored in the memory 113 and sends the decoded data to the memory 114. Then, the memory 114 writes the data received through the data bus 122 at the address designated by the address signal.

In the above-mentioned system, the coding key A4 read from the attribute memory 111 is not coded before sending it through the data bus 121 to the terminal 100. Therefore, the attribute data can be read by any terminal using JAIDA specifications. Thus, the memory card 110 can be used generally. Further, similarly to the system of the third embodiment, the address signal, the read data signal and the write data signal transmitted between the terminal 70 and the memory card 80 are all coded. Therefore, the secrecy of data is improved further than in the systems of the first and second embodiments.

Figure 5:
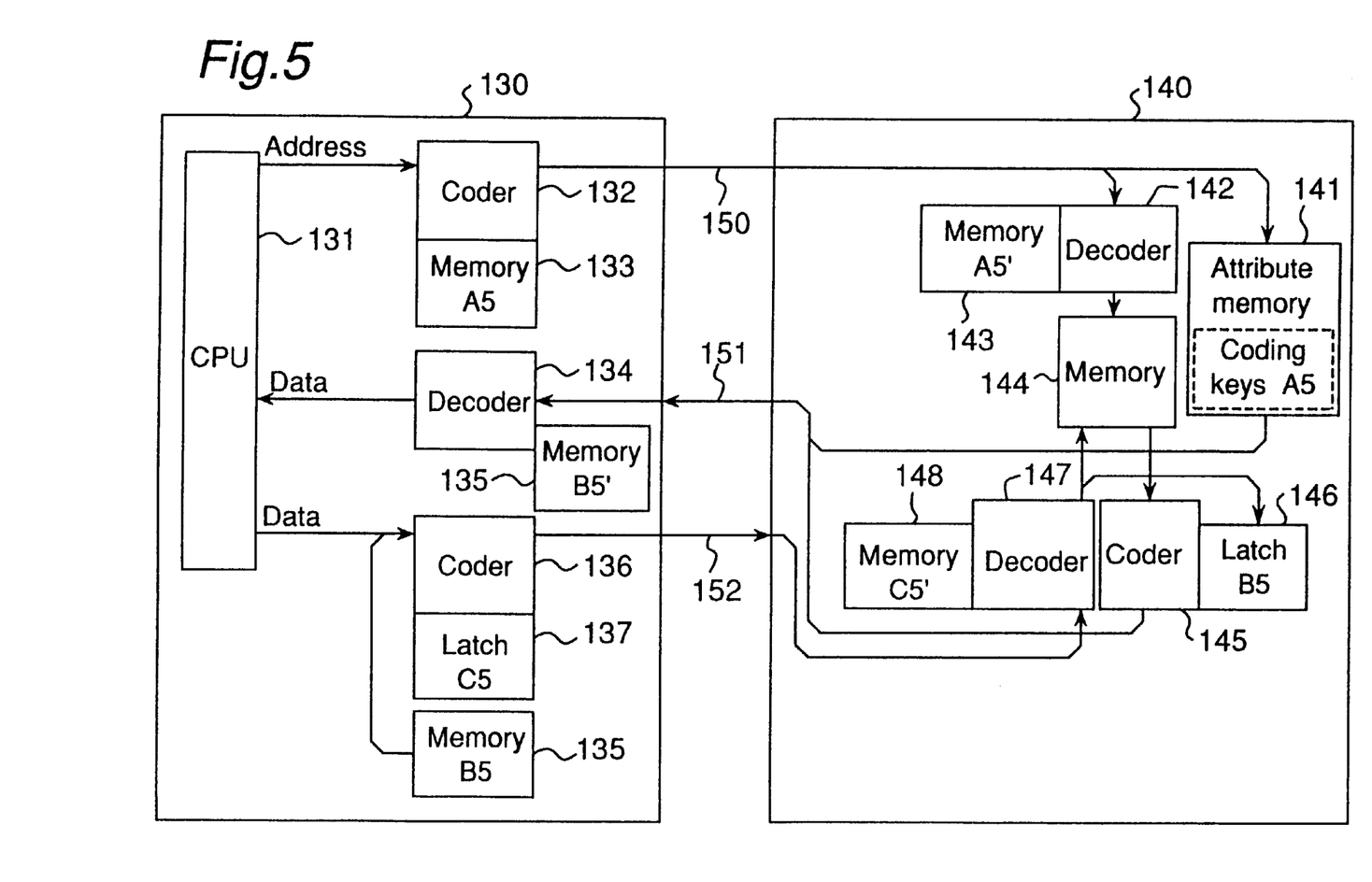
FIG. 5 is a block diagram of a system in accordance with a fifth embodiment comprising a computer or terminal and a memory card connected to the terminal.

FIG. 5 shows a block diagram of a system of a fifth embodiment comprising a terminal or computer 130 and a memory card 140 connected thereto. The terminal 130 and the memory card 140 are connected via an address bus 150, a first data bus 151 for transmitting data from the memory card 140 to the terminal 130, and a second data bus 152 for transmitting data from the terminal 130 to the memory card 140. In this system, an address signal and a write data signal to be transmitted from the terminal 130 to the memory card 140 are coded with a public key A5, while a data signal to be transmitted from the memory card 140 to the terminal 130 is also coded with another public key B5. The coding key B5 used by the memory card 140 is stored in a memory 138 in the terminal 130. It is a feature of this embodiment that the coding key B5 stored in the memory 138 is sent to the memory card 140 when the memory card 140 is connected to the terminal 130. Thus, even if the memory card 140 is reproduced, by changing the coding key B5 and decoding key B5' periodically, illegitimate use of a memory card can be prevented in the terminal 130.

The system of this embodiment is explained further. When the memory card 140 is connected to the terminal 130, a central processing unit (CPU) 131 in the terminal 130 first makes a coder 136 receive a coding key B5 stored in the memory 138 through the data bus 152 a coder 72. The coder 136 codes the coding key B5 with a coding key C5 stored in a memory 137 and sends the coded coding key B5 through the data bus 152 to the memory card 140. A decoder 147 in the memory card 140 decodes the coded coding key B5 with a decoding key C5' stored in a memory 148, and the decoded coding key B5 is latched in a latch 146.

When data is read from the memory card 140, the CPU 131 in the terminal 130 outputs an address signal for designating a read address to the memory card 140. The coder 132 codes the read address with the coding key A5 stored in the memory 133, and the coded address signal is transmitted through the address bus 150 to a decoder 142 in the memory card 140. The decoder 142 decodes the coded address signal with a decoding key A5' stored in a memory 143, where the decoding key A5' corresponds to the coding key A5, and it sends the decoded address signal to the memory 144. The memory 144 outputs a data stored at an address designated by the address signal. A coder 145 receives a data read from the memory 144 according to the address signal, and it codes the data with coding key B5 stored in the latch 146. The coded data is sent through the first data bus 151 to the decoder 134 in the terminal 130. The decoder 134 decodes the coded data with a decoding key B5' stored in a memory 135, where the decoding key B5' corresponds to the coding key B5. The decoder 134 sends the decoded data to the CPU 131.

When data is written to the memory card 140, the CPU 131 in the terminal 130 outputs an address signal for designating a write address to the coder 132 and a data signal to be written to the memory 144 to a coder 136. The coder 132 codes the read address with the coding key A5 stored in the memory 133, and the coded address signal is transmitted through the address bus 150 to a decoder 142 in the memory card 140. The decoder 136 decodes a data signal with the decoding key C5 stored in a memory 137, and it sends the decoded signal to the memory card 140. On the other hand, a coder 136 in the terminal 130 codes the data signal with a coding key C5 stored in the memory 137 and sends the coded data signal to the memory card 140. The decoder 142 in the memory card 140 codes the data with the decoding key A5' stored in the memory 143, and it sends the decoded data to the memory 144. The decoder 147 decodes the data with a decoding key C5' stored in a memory 148 and sends the decoded data to the memory 144. Thus, the memory 144 writes the data at the address designated by the address signal.

In the above-mentioned system, the coding key B5 is sent from the terminal 130 to the memory card 140. Therefore, the coding key B5 and the decoding key B5' can be set at any values by the terminal 130. For example, the terminal 130 can change the coding key B5 and the decoding key B5' every time a memory card 140 is set in the terminal 130. Then, a memory card 140 reproduced illegitimately cannot be used in this system. Further, since both the address signal and read data signal are coded, data cannot be read out by using an illegitimate terminal or an illegitimate memory card. Still further, by coding the coding key B5', it becomes difficult to analyze the decoding key B5'. Thus, the secrecy of data is improved effectively.

Figure 6:
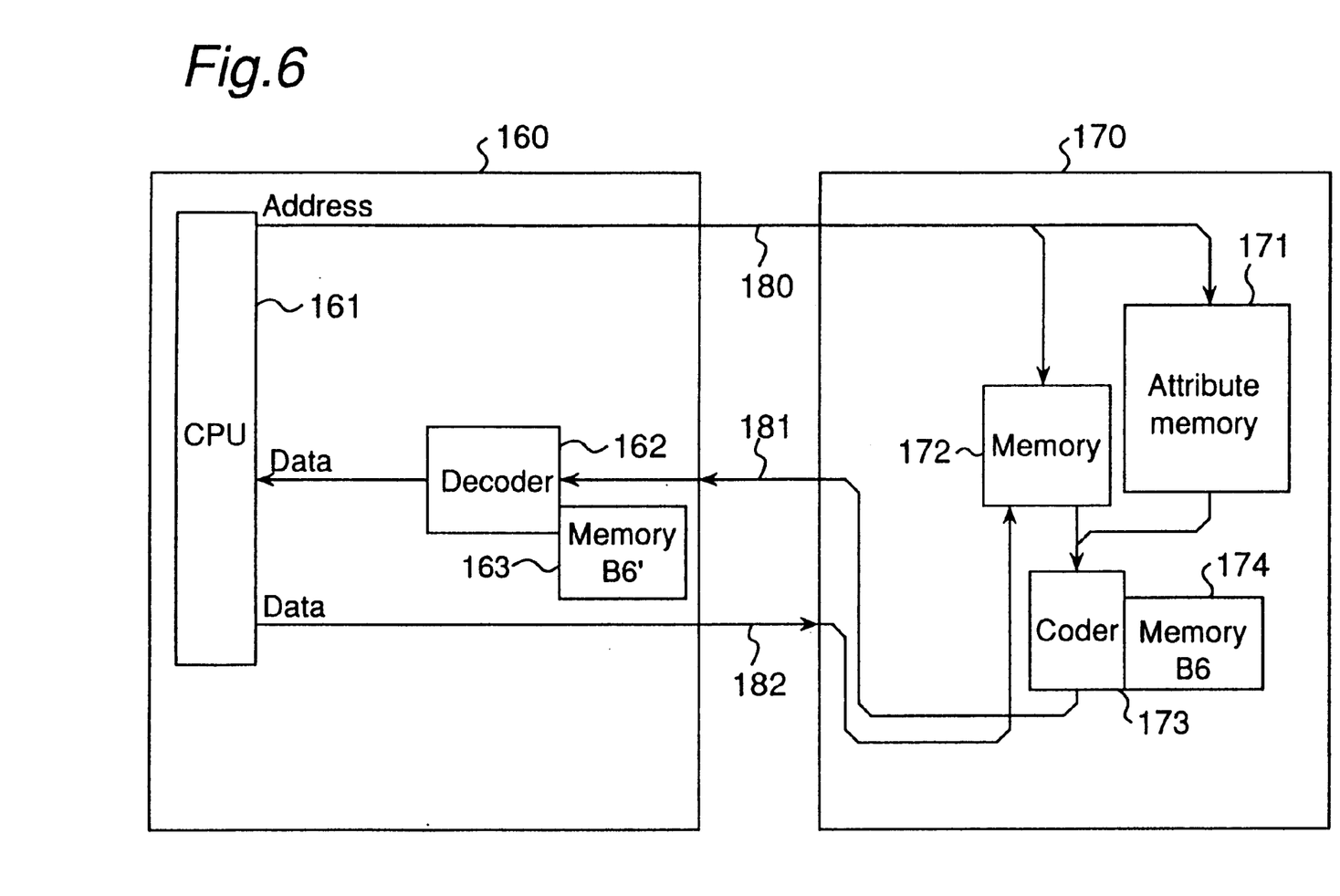
FIG. 6 is a block diagram of a system in accordance with a sixth embodiment comprising a computer or terminal and a memory card connected to the terminal.

FIG. 6 shows a block diagram of a system of a sixth embodiment comprising a terminal or computer 160 and a memory card 170 connected thereto. The terminal 160 and the memory card 170 are connected via an address bus 180, a first data bus 181 for transmitting data from the memory card 170 to the terminal 160, and a second data bus 182 for transmitting data from the terminal 160 to the memory card 170. In this system, data read from a memory 172 in the memory card 170 is coded with a public key by a coder 173, and the coded data is sent to the terminal 180. This system has a much simplified structure as compared with the system shown in FIG. 1, specifically, in the point that coding and decoding of an address signal are not performed. Thus, it can be constructed with a lower cost.

The system of this embodiment is explained further. When data is read from the memory card 170, the CPU 161 in the terminal 160 outputs an address signal for designating a read address through the address bus 180 to the memory card 170. The memory 172 outputs data stored at an address designated by the address signal to a coder 173. The coder 173 codes the data with a coding key B6 stored in a memory 174 and sends the coded data to the terminal through the data bus 181. A decoder 162 in the terminal 160 decodes the coded data with a decoding key B6' stored in a memory 163, where the decoding key B6' corresponds to the coding key B6. The decoder 162 sends the decoded data to the CPU 161.

When data is written to the memory card 170, the CPU 161 in the terminal 130 outputs an address signal for designating a write address through the address bus 180 and a data signal to be written to the memory card 170 through the data bus 182. Then, the memory 172 writes the data at the address designated by the address signal.

In the above-mentioned system, data read from the memory card 170 is coded and sent to the terminal 160. Therefore, by using a simple means, reading of the data in the memory card 170 is prevented, and a terminal to be connected to the memory card is limited. Further, attribute data read from the attribute memory 171 are output through the data bus without being coded. Therefore, the attribute data can be read by any terminal using JAIDA specifications. Thus, the system can be used generally.

Figure 7:
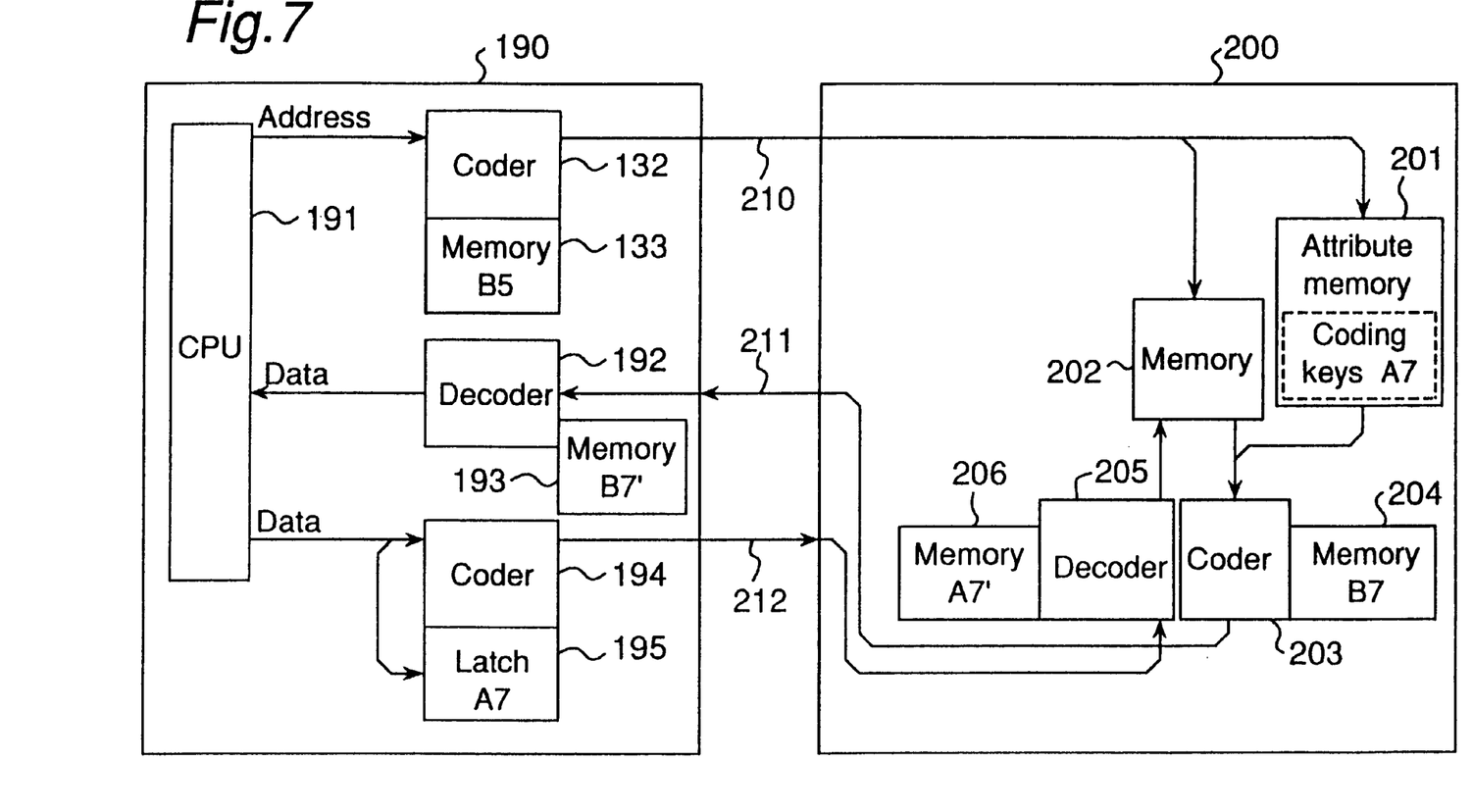
FIG. 7 is a block diagram of a system in accordance with a seventh embodiment comprising a computer or terminal and a memory card connected to the terminal.

FIG. 7 shows a block diagram of a system in accordance with a seventh embodiment comprising a terminal or computer 190 and a memory card 200 connected thereto. The terminal 190 and the memory card 200 are connected via an address bus 210, a first data bus 211 for transmitting data from the memory card 200 to the terminal 190, and a second data bus 212 for transmitting data from the terminal 190 to the memory card 200. In this system, a data signal to be transmitted from the terminal 70 to the memory card 80 is coded with a public key A7, while a data signal to be transmitted from the memory card 80 to the terminal 70 is also coded with another public key B7. The coding key A7 used by the terminal 190 for coding a data signal is stored in an attribute memory 201 in the memory card 200, and the coding key A7 stored in the attribute memory 201 is sent after coded to the terminal 190 when the memory card 200 is connected to the terminal 190. It is a feature of the embodiment that the coding and decoding of address signals are omitted in the system of the third embodiment shown in FIG. 3.

The system of this embodiment is explained further. When the memory card 200 is connected to the terminal 190, a central processing unit (CPU) 191 in the terminal 190 first sends a prescribed address signal through the address bus 210 to the memory card 200. An attribute memory 20 outputs attribute data including a coding key A7 to a coder 203, and the coder 203 codes the coding key A7 with a coding key B7 stored in a memory 204, and sends the coded coding key through the first data bus 211 to a decoder 192 in the terminal 190. The decoder 192 decodes the coded coding key A7 with a decoding key B7' stored in a memory 193, and the decoded coding key A7 is latched in a latch 195. The decoding key B7' corresponds to the coding key B7. The terminal 190 receives attribute data read from the attribute memory 201 through the first data bus 211.

When data is read from the memory card 200, the CPU 191 in the terminal 190 outputs an address signal for designating a read address through the address bus 210 to the memory card 200. Then, the memory 202 outputs data stored at the address to a coder 203. The coder 203 receives the data and it codes the data with a coding key B7 stored in a memory 204. The coded data is sent through the first data bus 211 to the decoder 192 in the terminal 190. The decoder 192 decodes the coded data with a decoding key B7' stored in a memory 193, where the decoding key B7' corresponds to the coding key B7. The decoder 192 sends the decoded data to the CPU 191.

When data is written to the memory card 200, the CPU 191 in the terminal 190 outputs an address signal for designating a write address through the address bus 210 to a memory 202 in the memory card 200, while it also outputs a data signal to be written to a coder 194. The coder 194 codes the data with the coding key A7 stored in the latch 195 and sends the coded data through the second data bus 212 to a decoder 205 in the memory card 200. The decoder 205 decodes the coded data with a decoding key A7' stored in a memory 206 and sends the decoded data to the memory 202. Then, the memory 202 writes the data received through the data bus 212 at the address designated by the address signal.

In the above-mentioned system, though the address signal is not coded, the read data signal and the write data signal transmitted between the terminal 190 and the memory card 200 are all coded. Therefore, illegitimate accessing of data by a third party is prevented. Further, even if the memory card 200 is reproduced illegitimately, the data cannot be read by a terminal having no decoding key B7'. Thus, the secrecy of data is improved.

Figure 8:
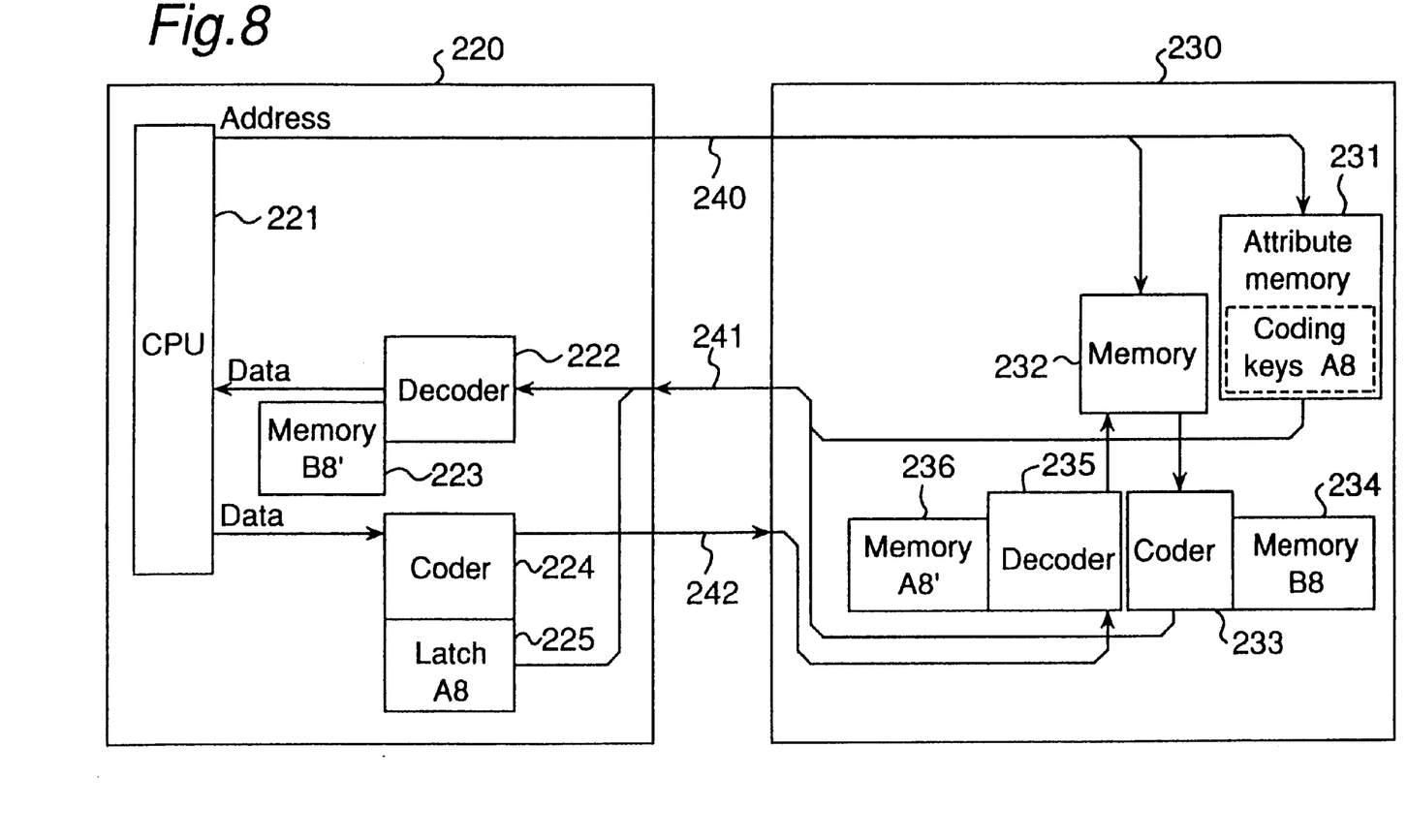
FIG. 8 is a block diagram of a system in accordance with an eighth embodiment comprising a computer or terminal and a memory card connected to the terminal.

FIG. 8 shows a block diagram of a system in accordance with an eighth embodiment comprising a terminal or computer 220 and a memory card 230 connected thereto. The terminal 220 and the memory card 230 are connected via an address bus 240, a first data bus 241 for transmitting data from the memory card 230 to the terminal 220, and a second data bus 242 for transmitting data from the terminal 220 to the memory card 230. In this system, a data signal to be transmitted from the terminal 220 to the memory card 230 is coded with a public key AS, while a data signal to be transmitted from the memory card 230 to the terminal 220 is also coded with the public key A8. The coding key A8 is stored in an attribute memory 231 in the memory card 230, and the coding key A8 is sent to the terminal 220 when the memory card 230 is connected to the terminal 220. It is a feature of this embodiment that coding and decoding of address signals are omitted in the system of the fourth embodiment shown in FIG. 4.

The system of this embodiment is explained further. When the memory card 230 is connected to the terminal 220, a central processing unit (CPU) 221 in the terminal 220 first sends a prescribed address signal through the address bus 240 to the memory card 230. When the memory card 230 is connected, a latch 225 in the terminal 220 latches no data, and the attribute data 231 outputs attribute data including the coding key A8 through the data bus 241 to the terminal 220, and the coding key A8 is latched in the latch 225 in the terminal 220.

When data is read from the memory card 230, the CPU 221 in the terminal 220 outputs an address signal for designating a read address through the address bus 240 to the memory 232 in the memory card 230, and the memory 232 outputs data at the address to a coder 233. The coder 233 codes the data with a coding key B8 stored in a memory 234. The coded data is sent through the first data bus 241 to the decoder 222 in the terminal 220. The decoder 222 decodes the coded data with a decoding key B8' stored in a memory 223, where the decoding key B8' corresponds to the coding key B8. The decoder 222 sends the decoded data the CPU 221.

When data is written to the memory card 230, the CPU 221 in the terminal 220 outputs an address signal for designating a write address through the address bus 240 to the memory card 230, and it also outputs a data signal to be written to the memory 114 to a coder 224. The coder 224 codes the read data with the coding key A8 stored in the latch 225, and the coded data signal is transmitted through the data bus 242 to a decoder 235 in the memory card 230. The decoder 235 decodes the coded signal with the decoding key A8' stored in a memory 236, and it sends the decoded data signal to the memory 232. Then, the memory 232 writes the data received through the data bus 242 at the address designated by the address signal.

In the above-mentioned system, though the address signal is not coded, the read data signal and the write data signal transmitted between the terminal 220 and the memory card 230 are all coded. Therefore, illegitimate accessing of data by a third party is prevented. Further, even if the memory card 230 is reproduced illegitimately, the data cannot be read by a terminal having no decoding key B8'. Thus, the secrecy of data is improved. Further, the coding key A8 read from the attribute memory 231 is not coded before sending it through the data bus 241 to the terminal 220. Therefore, the attribute data can be read by any terminal using JAIDA specifications. Thus, the memory card 230 can be used generally.

Figure 9:
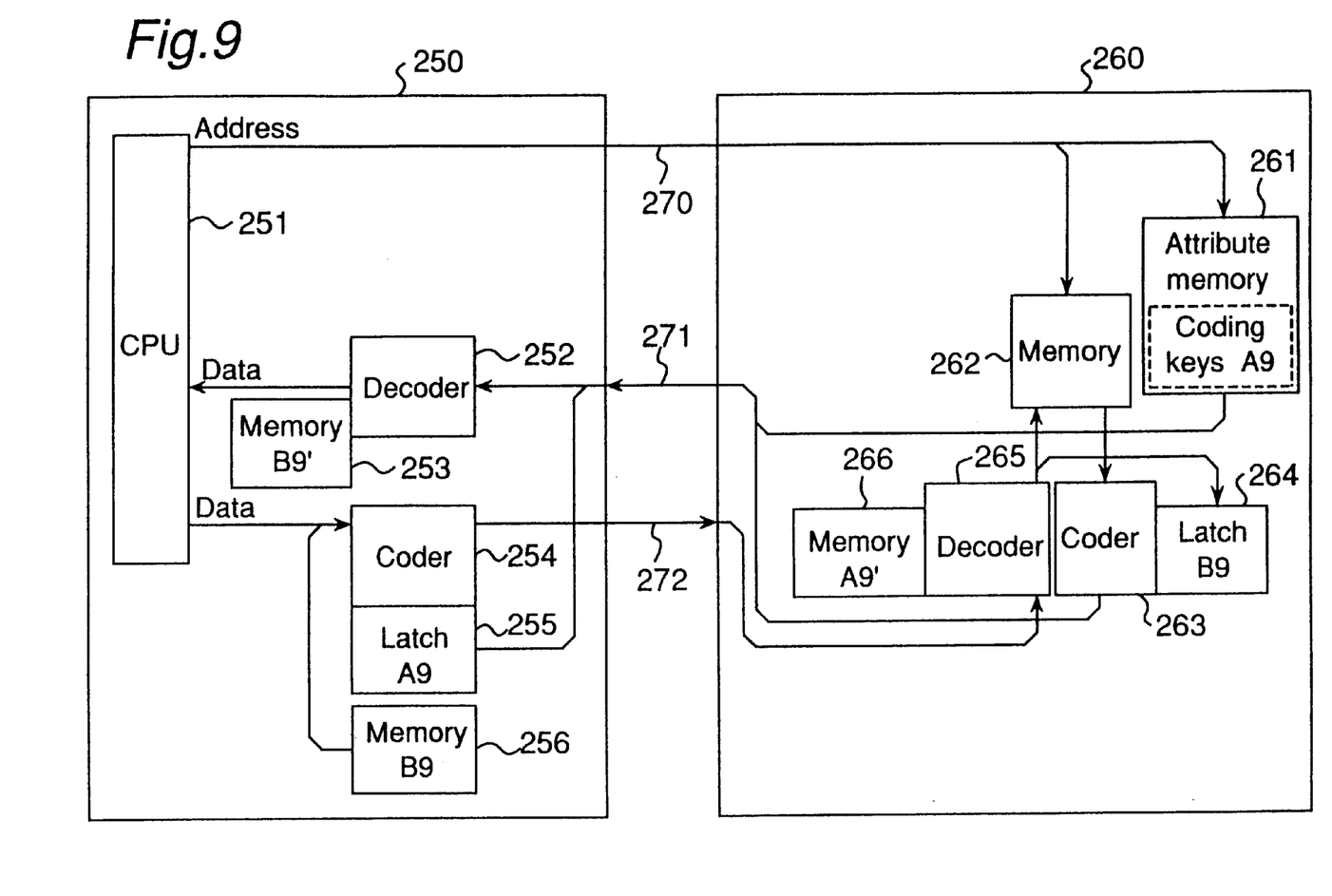
FIG. 9 is a block diagram of a system in accordance with a ninth embodiment comprising a computer or terminal and a memory card connected to the terminal.

FIG. 9 shows a block diagram of a system in accordance with a ninth embodiment comprising a terminal or computer 260 and a memory card 270 connected thereto. The terminal 260 and the memory card 270 are connected via an address bus 270, a first data bus 271 for transmitting data from the memory card 270 to the terminal 260, and a second data bus 272 for transmitting data from the terminal 250 to the memory card 260. In this system, a data signal to be transmitted from the terminal 250 to the memory card 260 is coded with a public key A9, while a data signal to be transmitted from the memory card 260 to the terminal 250 is also coded with the public key A9. The coding key A9 used for data to be written is stored in an attribute memory 261 in the memory card 260, and it is sent to the terminal 250 when the memory card 260 is connected to the terminal 250. A coding key B9 for coding a data sent from the memory card 260 is provided in a memory 256 in the terminal 250, and it is sent through the data bus 272 to the memory card 260 when the memory card 260 is connected to the terminal 250. It is a feature of this embodiment that the coding and decoding of address signal are omitted in the system of the fifth embodiment shown in FIG. 5.

The system of this embodiment is explained further. When the memory card 260 is connected to the terminal 250, a central processing unit (CPU) 251 in the terminal 250 first sends a prescribed address signal through the address bus 270 to an attribute memory 261. The attribute memory 261 sends the coding key A9 through the data bus 271 to be latched in a latch 255 in the terminal 250. The coder 254 codes the coding key B9 sent from the memory 256 with the coding key A9 stored in the latch 255 and it sends the coded data through the data bus 272 to a decoder 256 in the memory card 260. The decoder 256 decodes the coded coding key B9 with a decoding key A9' stored in a memory 266, and the decoded coding key B9 is latched in a latch 264. The decoding key A9' corresponds to the coding key A9.

When data is read from the memory card 260, CPU 251 in the terminal 250 outputs an address signal for designating a read address through the address bus 270 to the memory 262 in the memory card 260. The memory 262 outputs data stored at an address designated by the address signal to a coder 263. The coder 263 codes the data with the coding key B9 stored in the latch 264. The coded data is sent through the first data bus 271 to the decoder 252 in the terminal 250. The decoder 252 decodes the coded data with a decoding key B9' stored in a memory 253, where the decoding key B9' corresponds to the coding key B9. The decoder 252 sends the decoded data to the CPU 251.

When data is written to the memory card 260, the CPU 251 in the terminal 250 outputs an address signal for designating an address through the address bus 270 to the memory 262 in the memory card 260, while it outputs a data to the coder 254. The coder 254 codes the data signal with a coding key A9 stored in the latch 255 and sends the coded data signal to the decoder 265 in the memory card 140. The decoder 265 codes the data with the decoding key A9' stored in the memory 266, and it sends the decoded data to the memory 262. Thus, the memory 262 writes the data at the address designated by the address signal.

In the above-mentioned system, though the address signal is not coded, the read data signal and the write data signal transmitted between the terminal 250 and the memory card 260 are all coded. Therefore, illegitimately accessed data by a third party is are prevented. Further, even if the memory card 260 is reproduced illegitimately, it is difficult to identify the decoding key B9', and the data cannot be read by a terminal having no decoding key B9' in correspondence to a coding key B9. Thus, the secrecy of data is improved. Further, the coding key A9 read from the attribute memory 261 is not coded before sending it through the data bus 271 to the terminal 250. Therefore, the attribute data can be read by any terminal using JAIDA specifications. Thus, the memory card 230 can be used generally.

In one of the above-mentioned systems, a memory card can be used only for a particular terminal. Further, even if data in a memory card is copied illegitimately or a memory card is reproduced illegitimately, access to the data can be prevented. Therefore, such a memory card can be used for storing personal data or secret documents.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A data security system comprising:

a computer; and a memory card insertable into the computer to provide an additional storage medium for the computer, the memory card including:
   a first memory device for storing data and receiving an address signal from the computer,
   a second memory device for storing a plurality of first coding keys having a plurality of values, and
   a first data coder for coding a first data signal received from the first memory device, and to be output to the computer, using a public key cryptosystem including the first coding keys stored in the second memory device, the computer including:
   a processor generating the address signal and a second data signal, and receiving a third data signal,
   a third memory device for storing a first decoding key having a value different from the values of the first coding keys stored in the second memory device, and
   a first data decoder for decoding a coded data signal received from the first data coder in the memory card using the public key cryptosystem including the first decoding key stored in the third memory device.

2. The data security system according to claim 1, wherein the computer further comprises:
   a fourth memory device for storing a plurality of second coding keys having a plurality of values different from the values of the first coding keys, and
   a second data coder for coding the second data signal received from the processor to be sent to the memory card by using the public key cryptosystem including the second coding keys stored in the fourth memory device, and the memory card comprises:
   a fifth memory device for storing a second decoding key, the second decoding key having a value different from the values of the second coding keys, and
   a second data decoder for decoding a fourth data signal received from the second coder, to be sent to the first memory device, using the public key cryptosystem including the second decoding key stored in the fifth memory device.

3. The data security system of claim 1 wherein the public key cryptosystem comprises a Rivest, Shamir, and Alderman system.

4. The data security system of claim 2 wherein the memory card transmits the second coding keys from the second memory device to the computer when the memory card is inserted in the computer and wherein the computer stores the second coding keys in the fourth memory device.

* * * * *